INVENTORS.
GEORGE R. BUYNAK
ROY K. PAXTON

ATTORNEY

United States Patent Office 3,459,392
Patented Aug. 5, 1969

3,459,392
PASSIVE HOMING GUIDANCE SYSTEM
George R. Buynak, Cuyahoga Falls, Ohio, and Roy K. Paxton, Orlando, Fla., assignors to Goodyear Aerospace Corporation, Akron, Ohio, a corporation of Delaware
Filed Sept. 24, 1959, Ser. No. 843,034
Int. Cl. F42b 15/02; G06f 15/50; F41g 7/00
U.S. Cl. 244—3.17  7 Claims This invention relates to mechanism for guiding vehicles, such as a missile, and is more particularly concerned with mechanism which will "home" the missile on a selected target or area.

It has been proposed heretofore, for example in the patent application of Meneley and Langworthy, Ser. No. 66,048, filed Dec. 18, 1948, and now Patent No. 3,193,822, to provide guidance for a pilotless aircraft or the like by the automatic comparison, without human intelligence, of terrain information with stored reference information, and from the results of this comparison to generate automatically lateral and longitudinal error data with respect to a planned flight path, together with means for automatically employing the error data to correct the course of the aircraft. It has likewise been proposed in the patent application of Robert G. Wilson, Ser. No. 227,511, filed May 21, 1951, and now Patent No. 3,226,057, to provide mechanism for converting the apparatus disclosed and claimed in the aforesaid application to the operation and control of an automatically guided vehicle over a body of water or other terrain devoid of contrasting detail except an isolated target or reference point, such as a ship, buoy, rock, or the like.

It is the general object of this invention to provide a system of vehicle or missile guidance wherein a missile is brought into radar or visible range of a selected target by means of a manned aircraft, a picture of the target is recorded in the missile, the missile is fired, an image of the terrain towards which the missile is headed is continuously provided in the missile, the picture and image are continuously compared, as a result of the comparison guidance corrections are passed to the missile direction controls, and means are provided for changing the effective size of the picture as a function of range.

Another object of the invention is the provision of optical and/or electrical mechanism of the type described characterized by lightness of weight, and compactness of size, and capable of guiding a missile to within a few feet of a target from ranges between about one mile and about a dozen miles away.

The foregoing objects of the invention, and other objects which will become apparent as the description proceeds, are achieved by providing a system for guiding a missile from a manned aircraft to a surface target, or the like, of an aircraft, a missile, means for reelasably securing the missile to the aircraft, means providing a picture of a surface target area in the missile, means simultaneously providing the picture of the target area in the aircraft, means for firing the missile from the aircraft, means for substantially continuously providing in the missile and in comparative relation to the picture an image of the surface area towards which the missile is headed, means in the missile for effecting comparison between the picture and image, means in the missile responsive to the comparison to bring the missile into correct heading for the target, and means in the missile for changing the effective comparison size of the picture as a function of decreasing range.

For a better understanding of the invention, reference should be had to the accompanying drawings, wherein.

Figure 1:
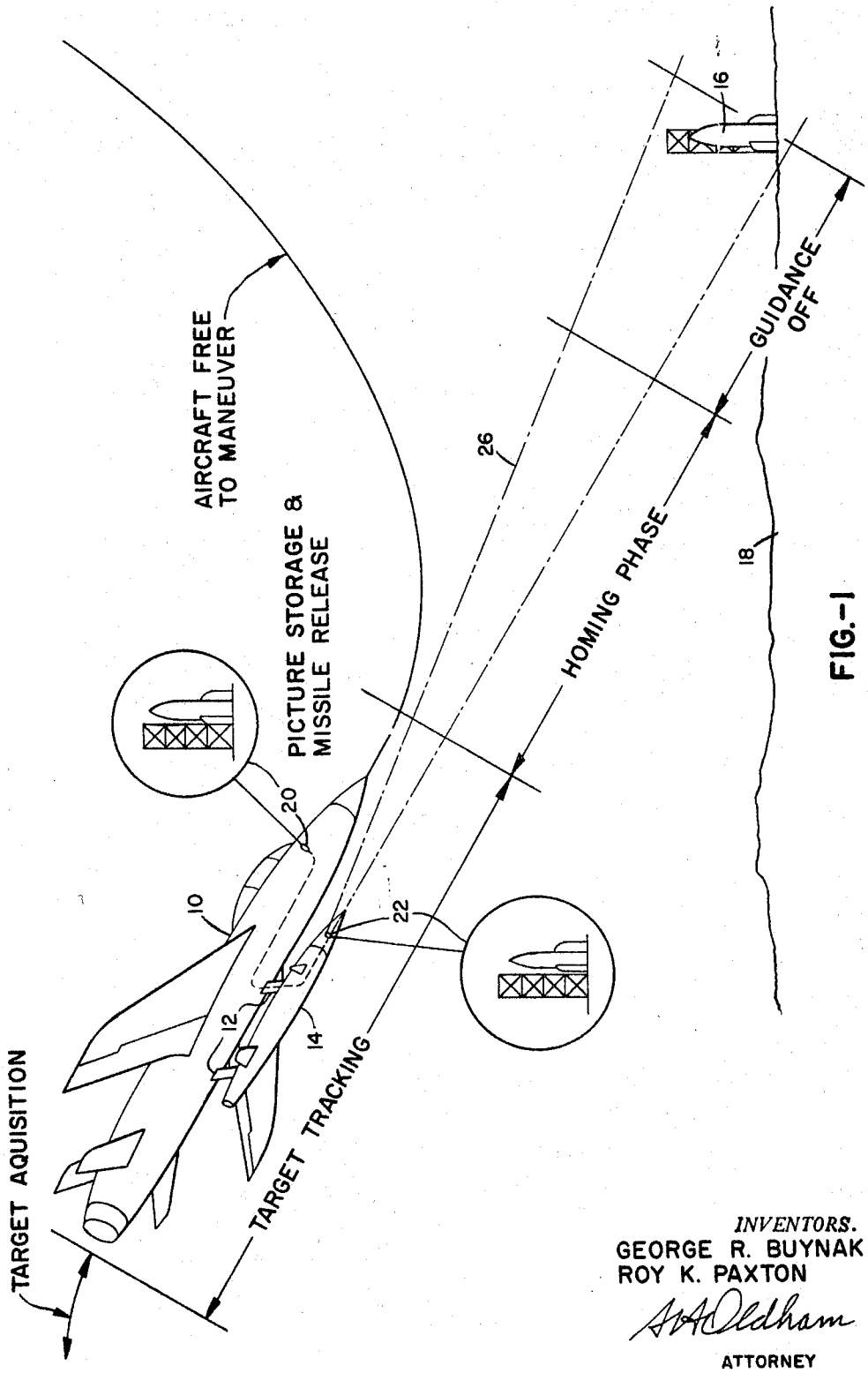
FIG. 1 is a diagrammatic perspective view of the system of the invention including carrier, missile and target.

The numeral 10 indicates a carrier, such as a piloted airplane, to which is releasably secured by means indicated at 12, a missile 14 containing a power plant capable of driving the missile after release from the carrier 10 to a selected target 16 positioned on terrain 18, usually at a range from about one to about a dozen miles away from the point of release. The missile power plant is either of the continuous type or of the rapid acceleration and coast type.

The missile 14 contains guidance mechanism, as hereinafter described, capable of guiding the missile home against the target 16. As shown in FIG. 1, there is a period of time marked "Target Acquisition" before missile release during which the target is located or selected by the pilot, followed by a period of time before missile release marked "Target Tracking." During this "Target Tracking" time the missile 14 and carrier 10 are usually pointed at the target 16 and duplicate pictures 20 and 22 are electrically and/or optically provided or produced respectively in the carrier 10 in front of the pilot and in the missile 14 of the desired target 16. It will be understood that the pilot will maneuver the carrier 10 during this time so that the pictures 20 and 22 are of the desired target 16.

The picture 22 in the missile 14 is then stored as a reference by which the missile can be guided to the target. The pilot then operates means 12 to release the missile from the carrier 10 simultaneously firing the power plant, usually a solid fuel rocket, to power the missile. The released and fired missile 14 then enters upon the "Homing Phase" of its flight being automatically guided towards the target 16, and the carrier 10 is left "Free to Maneuver," take evasive tactics, return to base, etc., under the control of its pilot. The final phase of the flight of the missile is "Guidance Off" but this occurs so near the end of the flight path that the missile hits the target within accuracy limits of, for example, thirty feet.

For purposes of simplification the optical system of the invention will be described first. However, it should be noted that the electrical system is normally preferred in the actual construction and operation of the invention.

Figure 2:
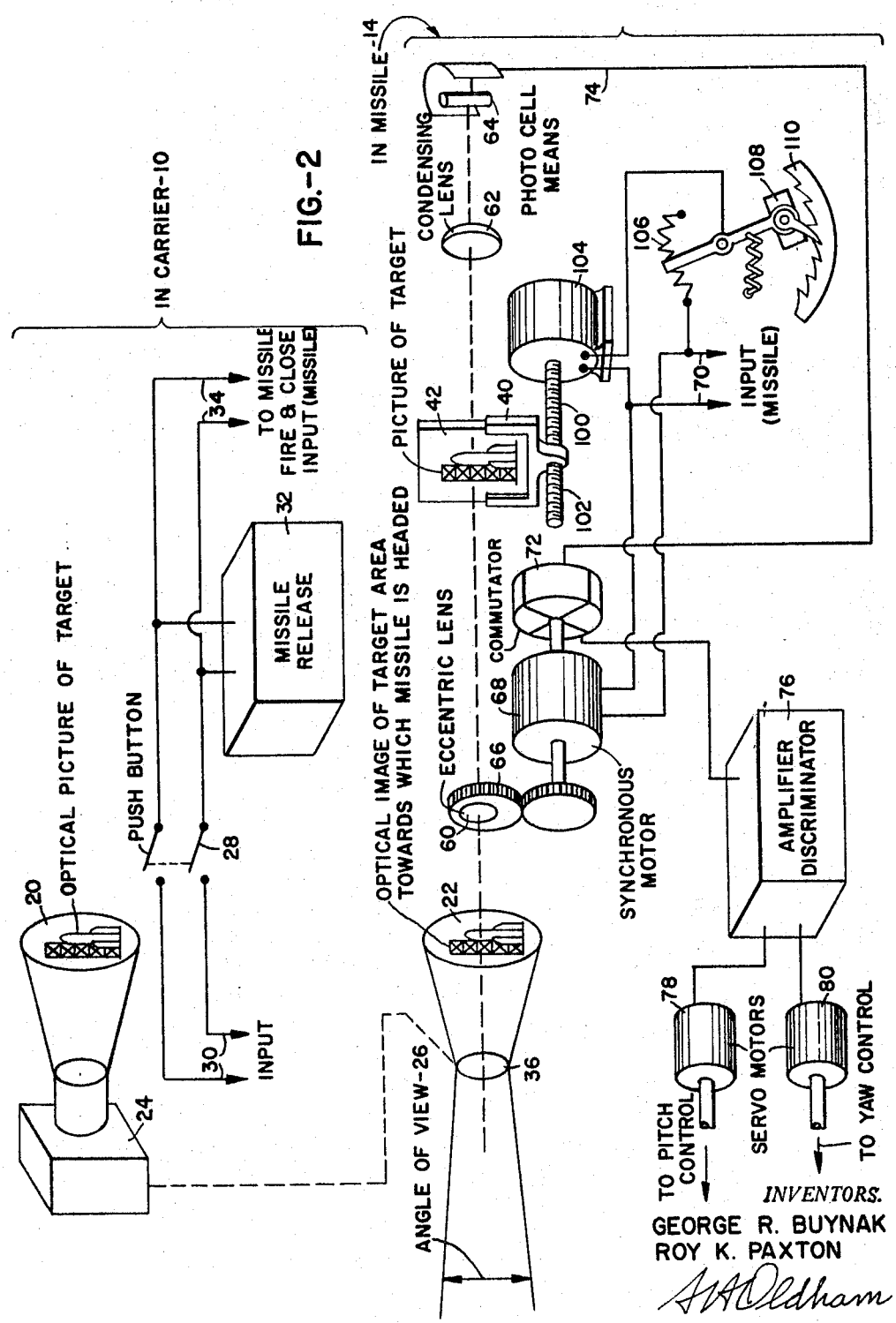
FIG. 2 is a diagrammatic perspective view of an optical embodiment of the invention.

Looking now at FIG. 2 which diagrammatically details the primarily optical guidance mechanism, missile 14 includes the image or picture 22 produced by suitable radar or optical means 36 with an angle of view 26 from in front of the missile 14. Companion picture 20 in carrier 10 is produced from picture 22 with picture 20 being positioned in front of the pilot of carrier 10. A "slave" unit 24 is coupled to the optical means 36 to produce the picture 20 in the carrier 10. Such "slave" unit 24 is conventional in the art and functions in an optical-mechanical manner utilizing combinations of mirrors, lenses, and the like to transmit the picture 22 optically to the carrier 10 to there display as picture 20. It will be apparent that the picture 20 may be produced in the carrier 10 by providing in the carrier a duplicate unit of that indicated by the numerals 26, 36, and 22 in the missile 14. However, the arrangement shown is preferred to eliminate any parallax such as would arise with duplicate units and which, dependent on physical factors involved, would necessitate additional corrective means. Thus, during the "Target Tracking" run the picture which is produced at 22 should be that of the desired target 16 when the carrier 10 is properly maneuvered and at the proper range, assuming reasonable visibility.

The carrier 10 also has a pilot operated push button 28 connecting a suitable electrical input 30 which when first closed starts the missile input circuits to start matching picture 42 and image 22, then fires the missile and operates release latches or blowoffs 32 associated with means 12 holding the missile on the carrier.

In the missile 14 is the image 22 of the target produced by electrical or optical means 36 with an angle of view 26, this unit being duplicated in the unit in the carrier 10 and to the same scale and orientation so that what the pilot sees at 20 in the carrier is the duplicate of the image 22 in the missile 14. During "Target Tracking" the image 22 is stored in the missile 14 for reference purposes during the "Homing Phase" of the missile flight. This storing can be achieved in a plurality of ways. It is possible to take a transparent negative picture of the image of the target appearing at 22 during "Target Tracking" and then develop the picture rapidly and drop it into a frame 40. The developed picture 42 then becomes a reference against which the instantaneous image appearing at 22 can thereafter be matched during the "Homing Phase."

Or the picture 42 can be produced electrically, as for example, on a cathode ray tube with a long delay rastor, although the preferred technique is that set forth in detail in the hereinafter described electrical system.

The invention also contemplates, although it is not preferred, to provide in the frame 40 a transparent negative reference picture 42 of the target desired before the carrier 10 and missile 14 leave the ground. In this embodiment of the invention the picture 42 is produced by simulation in a photo laboratory taking a picture of a map, enlarging a target portion of a previous photograph, taking a photo at the proper angle of a model of the target, or the like. Or, again, the photo 42 can be made by a reconnaissance plane from a given heading, range, time, and altitude and to the same scale and orientation that the target will appear as image 22 when the carrier 10 returns to the same heading, time, range and altitude as the reconnaissance plane and begins its "Target Tracking" run. The picture 42 may, of course, be an optical or a radar picture, dependent on whether the image 22 is to be optical or radar.

When utilizing a previously prepared transparent, negative photo 42 in frame 40 the pilot can have a copy of the same photo adjacent to or even overlying the optical picture 20 in his cockpit so that when the photo 42 and picture 20 substantially coincide or match the push button 28 can be pressed to fire the missile from the carrier.

In the optional practice of optically obtaining and storing a reference picture of the target during the "Target Tracking" run of the carrier, once the reference picture 42 has dropped into the frame 40 the pilot closes push button 28 to fire the missile still holding the carrier on the "Target Tracking" run.

Thus, when the missile is fired either with a previously prepared picture 42 or with a picture 42 made during the "Target Tracking" run, the picture 42 in frame 40 and the image 22 are of the selected target area 16, are of opposite contrast, and are to substantially the same scale and orientation. The first missile then enters upon the "Homing Phase" of its flight towards the target and this flight is automatically guided by utilizing the stored information of picture 42 as a reference against which the substantially instantaneous image 22 showing where the missile is headed can be checked. If off line from the target the flight path of the missile is automatically corrected by mechanism which will now be described.

The image 22 of the terrain area towards which the missile 14 is headed is continuously superimposed upon the opposite contrast picture 42 of the target by means of a lens 60 with light from the image 22 passing through the picture and condensing lens 62 to light sensitive means, such as photocell 64. Lens 60 is mounted slightly eccentrically in a gear 66 rotated by a synchronous motor 68 driven from the missile input 70 which circuit has been closed upon the firing of the missile. The rotation of lens 60 thus causes the image to nutate or move with a small circular motion or scan in relation to the picutre 42. The shaft of motor 68 carries a four quadrant commutator 72 and the output 74 of the photocell 64 passes through the commutator to an amplifier discriminator 76 which in turn selectively drives a servomotor 78 effecting pitch control of the missile and/or a servomotor 80 effecting yaw control of the missile.

It will be understood that the output of the photocell 64 varies as the image 22 scans or nutates over the picture 42, the output approaching a minimum when the best match is approached between the image and picture, and the output increasing as the image and picture move away from the match position. It will be apparent that pictures of the same contrast may be utilized; such as two positives on a transparent base or two negatives on a transparent base. In such case, the output approaches a maximum as the match point is approached and decreases as the two images move away from the match position.

The commutator 72, being revolved synchronously with the lens mounting gear 66 provides the output signal of the photocell into four separate voltage signals corresponding to four quadrants of the scanning circle, namely, into up-down or pitch control and right-left or yaw control. The commutator 72 is phased with the scanning movement of the image 22 such that when, for example, the image is in the "up" quadrant, the signal from the photocell is brought out of the "up" segment of the commutator. It had been found that the difference in potential successively measured between opposed pairs of either the "up-down" or the "right-left" segments of the commutator 72 is indicative of the magnitude of displacement of the image 22 relative to the picture 42 in the corresponding direction, while the relative polarity of this differential potential is indicative of the direction of this displacement. This potential difference, or error signal, is utilized to correct the displacement between the image 22 and the picture 42 by operating missile guidance control motors 78 and 80, all as more fully discussed in the above listed patent applications.

Figure 3:
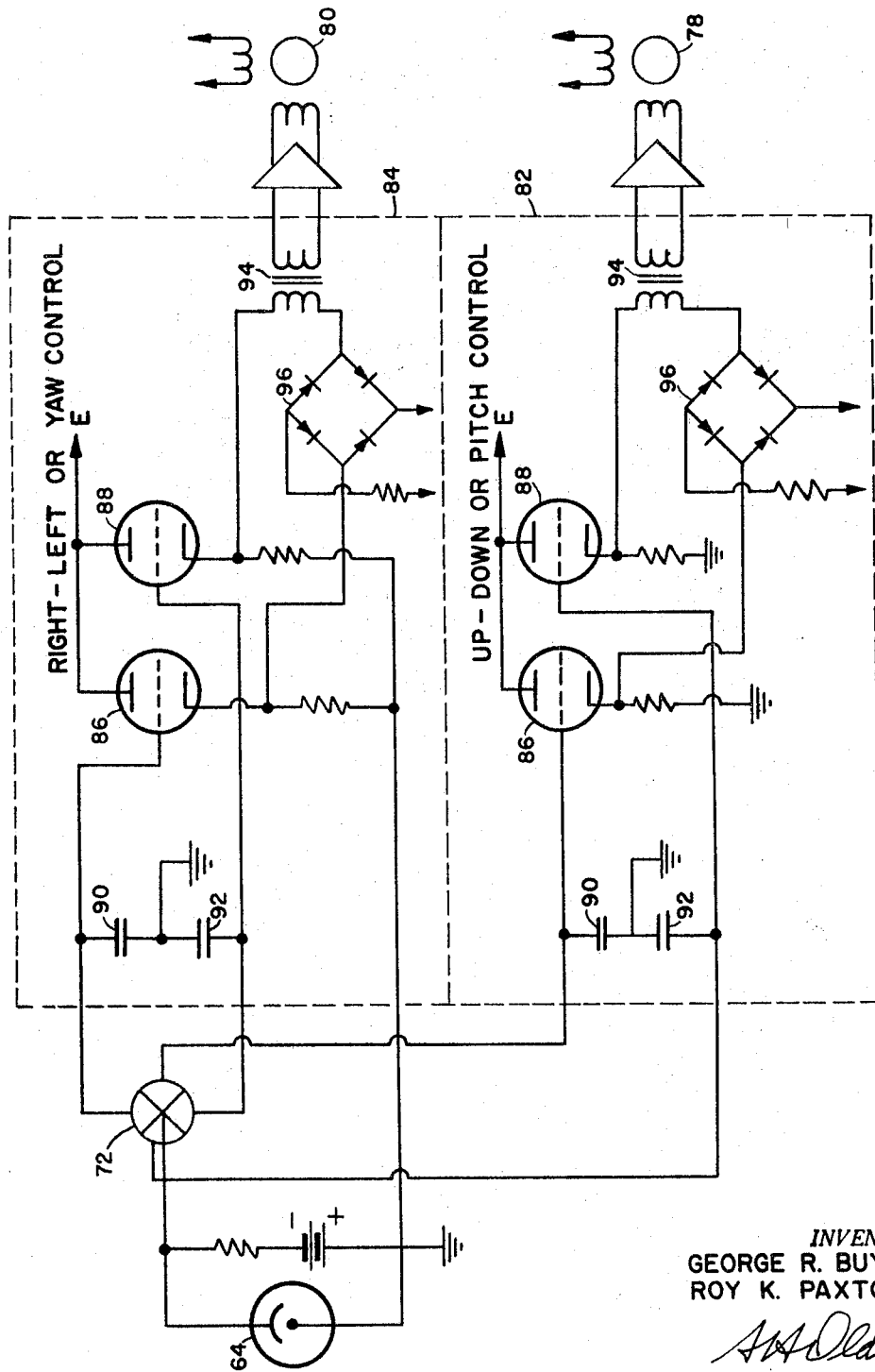
FIG. 3 is a wiring diagram of the error-producing and motor control circuits.

Movement of the motors 78 and 80 is derived from the error voltages developed across opposed segments of the commutator 72 by means of motor control circuits 82 and 84, respectively, shown in FIG. 3. Because the control circuits 82 and 84 are identical in their operation, only control circuit 82 will be described in detail.

Opposed segments of commutator 72 are directly connected to the control grids of a pair of cathode follower tubes 86 and 88. Condensers 90 and 92 provide filtering for the pulsating signals derived from the commutator so that the grids of the tubes are maintained at substantially D.C. potentials which change only with the light level falling on the photocell 64 during the portion of the circular scan of the image 22 on the picture 42 in which the corresponding commutator segment and grid is connected to the photocell.

Series connecting the cathodes of the tubes 86 and 88 is the primary of a transformer 94 and a ring modulator circuit 96. The ring modulator circuit 96 functions essentially as a switch permitting flow of current to the primary of the transformer 94 in proportion to the difference in potential on the cathodes of the tubes 86 and 88, the ring modulator interrupting the flow of current on alternate half cycles. The voltage signal across the secondary of the transformer 94 appears as an alternating voltage signal whose amplitude is proportional to the difference in potential of the cathodes of tubes 86 and 88 and which is either in phase or 180° out of phase with the alternating voltage signal applied across the modulator, depending upon the relative polarity of the cathodes of the tubes 86 and 88.

The voltage signal on the secondary of the transformer 94 is amplified and applied to one phase of the two phase servomotor 78. It will be evident that the speed of rotation of the motor 78 and its direction of rotation will be directly controlled by the voltage signal on the secondary of the transformer 94 and thus is a function of the error voltage derived across the opposing segments of the commutator 72. Actually, the amplitude of the voltage in the controlled phase is proportional to displacement of the image 22 from the picture 42.

An important feature of the invention is to incorporate in the apparent means for changing the scale of the picture 42 as a function of the change in range. In other words, as the missile 14 approaches the target 16 the scale of the image 22 increases and it is advisable to similarly increase the effective scale of picture 42. This is conveniently accomplished by changing the distance between picture 42 and lens 60 as a function of the change in range. More particularly, the frame 40 can be mounted on a nut 100 carried on a screw 102 driven by a motor 104 which is supplied electric current from missile input 70 through a motor speed regulating rheostat 106 whose arm position is controlled by an accelerometer diagrammatically shown at 108. Pawl and ratchet means 110 diagrammatically are shown to hold the arm of rheostat 106 in the accelerated position it being recognized that deceleration is normally not a factor with gravity compensating for an increase of air density. In order to better approximate the well-known formula $S = \frac{1}{2}at^2$ wherein $S$=distance, $a$=acceleration and $t$=time, the lens system 60 may be arranged to change the size of picture 42 as the square of the distance that picture 42 is moved by the screw 102. Or it is possible to cut the thread on screw 102 with a pitch which increases as the square of the motor 102 is running to thereby move the picture 42 in relation to the lens 60 so that the scale of picture 42 substantially coincides with the scale of image 22 as the range to the target closes.

Instead of storing a picture 42 optically during the "Target Tracking" run and then optically comparing an instantaneous image of the terrain ahead of the missile with the stored picture, all in the manner described, it is possible to electrically store a picture of the selected target area and then substantially instantaneously obtain electrical information of the terrain ahead of the missile which can be compared with the stored information to effect missile guidance control.

Figure 4:
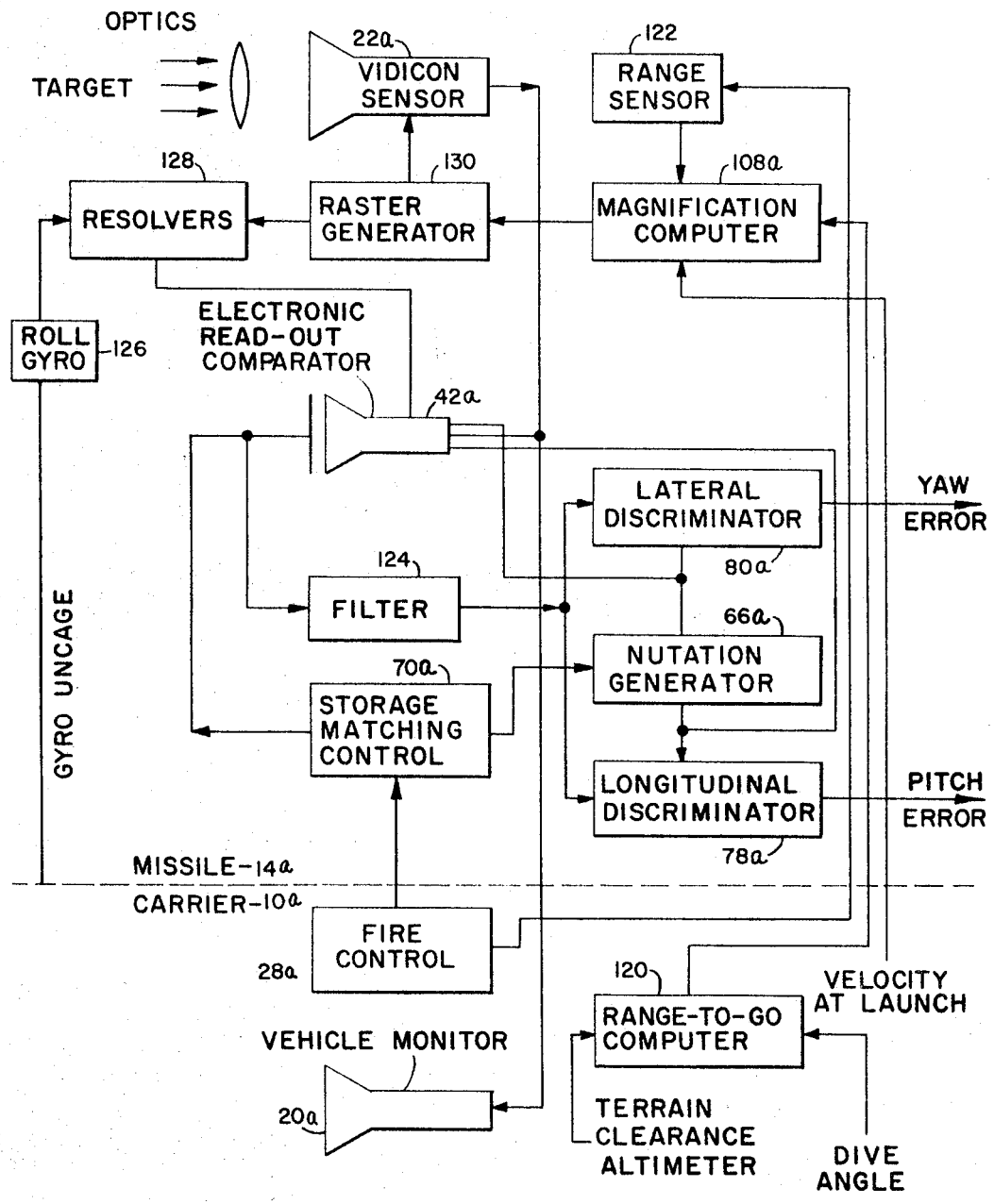
FIG. 4 is a block diagram of an electrical form of the invention.

An electric system is shown in box diagram in FIG. 4 from which it will be seen that the electrical system follows the fundamentals of the optical system, and like numerals will be employed except the suffix $a$ will be added. The carrier 10a includes a picture 20a of the target, this being produced, for example, on a cathode ray tube from the image created at 22a, as by a vidicon sensor carried in the missile. The carrier 10a may include a "Range-to-Go Computer" 120 fed dive angle and altitude information, the output of the computer 120 being fed to a "Magnification Computer" 108a along with velocity at launch information and a signal from a range sensor 122. The magnification change is thus continuously calculated and is used as hereinafter stated.

The information picked up by the vidicon sensor 22a is electrically stored in a storage tube 42a called an "Electronic Read-Out Comparator," for example a Raytheon RN-6835/QK-464 tube. In one embodiment of the invention, a conventional TV scan of 30 frames per second is employed, and an electronic nutation generator 66a provides for matching movement at 300 cycles per second between the target picture electrically stored on tube 42a and the instantaneous image 22a of the area ahead of the missile. Electronic nutation is effected in accord with the teaching of allowed patent application of Richard L. Burtner entitled "Electronic Map Matching Apparatus," filed Feb. 12, 1949, and bearing Ser. No. 76,152.

Upon the firing of the missile by fire control 28a storage matching control 70a begins to operate to allow the electrical comparison between the stored electrical picture at 42a and the instantaneous picture at 22a and error signals are passed to "Lateral Discriminator" 80a and to "Longitudinal Discriminator" 78a from the output of tube 42a, one side of the output having a filter 124 therein. The picture matching is effected in the storage tube 42a by inserting subsequent image scans by the vidicon 22a on the grid of tube 42a and a product match is obtained with the tube in read-out condition. Quotient matching, if desired, is effected by altering either the input signal intended for storage prior to missile release before storage, or the input signal from the vidicon sensor 22a to the storage tube 42a present during the operation after the missile release before feeding it to the storage tube 42a. In either case, such signal alternation is provided for by suitable electronic circuitry associated with and integrally a part of the vidicon sensor 22a. The nutation generator 66a supplies a reference signal to the phase discriminators 78a and 80a to achieve the same effect as the commutator in the optical system described hereinbefore.

The apparatus of FIG. 4 in the missile 14a may be electrically compensated against a roll gyroscope 126 as a reference which will be uncaged at missile launching so that any roll of the missile will not adversely affect operation of the system. The roll gyro 126 provides vertical information to resolvers 128 so that subsequent scans from the vidicon sensor will be aligned properly with the stored picture in the storage tube 42a. It will be apparent that roll compensation can be achieved by other means well known in the art such as optical-mechanical means utilizing rotating prisms, lenses, or the like.

The image size, obviously, will change on the vidicon 22a as the missile approaches the target. By expanding the raster scan on the vidicon 22a by controlling the raster generator 130 by the output of the magnification computer 108a the relative scales of the image at 22a and the stored picture at 42a can be kept substantially the same. Alternatively, the raster on the storage tube 42a can be shrunk to maintain the desired scale factor. It will be impossible to track over the complete missile flight because an infinite change of magnification would be required. However, guided flight over 85 to 90% of the course normally suffices to give the accuracy desired.

The operation of the electrical system is similar to that already described in detail in conjunction with the optical system. Good target visibility is a requisite of the systems as described although it will be recognized that the systems of the invention are readily usable with infra-red and high radio frequencies and radar technics to eliminate problems of visibility.

What is claimed is:

1. The combination in a system for guiding a missile from a manned vehicle to a target, or the like, of a vehicle, a missile, means for releasably securing the missile to the vehicle, sensing means providing a picture of a target in the missile, means simultaneously providing the picture of the target in the vehicle, means for firing the missile from the vehicle, means for substantially continuously providing in the missile and in comparative relation to the picture an image of the target towards which the missile is headed, means in the missile for effecting comparison between the picture and image, means in the missile responsive to the comparison to bring the missile into correct heading for the target, and means in the missile and controlled by acceleration of the missile for changing the effective comparison size of the picture as a function of decreasing range.

2. The combination in a system for guiding a missile from a manned aircraft to a surface target and including a manned aircraft, a missile, means for releasably securing the missile to the aircraft, optical means in the aircraft for producing a picture therein of a surface target area towards which the aircraft is substantially pointed, optical and photographic means in the missile for taking and storing the same picture of the target area in the missile, means for releasing the missile from the aircraft, means operable upon release of the missile from the aircraft for firing the power plant of the missile, optical means in the missile for substantially continuously providing an image of the surface area towards which the missile is headed, said picture and image being to substantially the same scale and orientation, means in the missile for effecting matching movement between the picture and the image, means in the missile responsive to the matching movement to bring the missile into correct heading for the target, and means in the missile for maintaining substantially the same scale between the picture and the image as the range closes between the missile and the target.

3. The combination in a system for guiding a missile from a manned aircraft to a surface target and including a manned aircraft, a missile, means for releasably securing the missile to the aircraft, means in the aircraft for producing a picture therein of a surface target area towards which the aircraft is substantially pointed, means in the missile for substantially simultaneously storing the picture of the target area, single element means for releasing and firing the missile from the aircraft, optical means in the missile for substantially continuously providing an image of the surface area towards which the missile is headed, means in the missile for effecting matching movement between the picture and the image, means in the missile responsive to the matching movement to bring the missile into correct heading for the target, and means in the missile for maintaining substantially the same scale between the picture and the image as the range closes between the missile and the target.

4. The combination in a system for guiding a missile from a manned aircraft to a surface target and including a manned aircraft, a missile, means for releasably securing the missile to the aircraft, means in the aircraft for producing a picture therein of a surface target area towards which the aircraft is substantially pointed, means in the missile for taking, rapidly developing and storing for reference purposes the same picture of the surface target area as appears in the aircraft, separate means for releasing and firing the missile from the aircraft, optical means in the missile for substantially continuously providing an image of the surface area towards which the missile is headed, means in the missile for effecting matching movement between the picture and the image, means in the missile responsive to the matching movement to bring the missile into correct heading for the target, and means in the missile and responsive to acceleration of the missile for maintaining substantially the same scale between the picture and the image as the range closes between the missile and the target.

5. A system for guiding a missile from a manned aircraft to a surface target and including a manned aircraft, missile, means for releasably securing the missile to the aircraft, electronic means in the missile for continuously and electrically taking a picture of the surface area towards which the missile is headed, means in the aircraft for producing the same picture in front of the pilot so that he can maneuver the aircraft to bring the missile to bear on the desired target, means in the missile for electrically storing the electric information of the picture when the pilot has the missile properly aligned with the desired target, means for releasing and firing the missile, means in the missile for electronically comparing the stored electrical information with the output of the electronic means for continuously and electrically taking a picture of the surface area towards which the missile is headed, means responsive to the comparing means to bring the missile into correct heading for the target, and means in the missile for maintaining substantially the same scale between the stored electrical information and the output of the electronic means as the range closes between the missile and the target.

6. A system for guiding a missile from a manned aircraft to a surface target and including a manned aircraft, a missile, means for releasably securing the missile to the aircraft, electronic means in the missile for continuously and electrically taking a picture of the surface area towards which the missile is headed, means in the aircraft for producing the same picture in front of the pilot so that he can maneuver the aircraft to bring the missile to bear on the desired target, means in the missile for electrically storing the electric information of the picture when the pilot has the missile properly aligned with the desired target, means for releasing and firing the missile, means in the missile for electronically comparing the stored electrical information with the output of the electronic means for continuously and electrically taking a picture of the surface area towards which the missile is headed, and means responsive to the comparing means to bring the missile into correct heading for the target.

7. The combination in a system for guiding a missile from a manned vehicle to a target, or the like, of a vehicle, a missile, means for releasably securing the missile to the vehicle, first sensing means providing a picture of a target area in the missile, second sensing means simultaneously providing the picture of the target area in the vehicle, said first and second sensing means in the missile and in the vehicle being operable when the missile and vehicle are pointed at the target area from which the pictures are made, means for firing the missile from the vehicle, means for substantially continuously providing in the missile and in comparative relation to the picture an image of the area towards which the missile is headed, means in the missile for effecting comparison between the picture and image, means in the missile responsive to the comparison to bring the missile into correct heading for the target, and means in the missile for changing the effective comparison size of the picture as a function of decreasing range.

References Cited

UNITED STATES PATENTS 2,884,540 4/1959 Shockley _____ 244—14
2,814,199 11/1957 Waldorf _____ 343—112

OTHER REFERENCES

Aviation Week, "Optical Guidance Designed for Missile," Dec. 8, 1958, pp. 67, 69 and 71.

Technical Data Digest (USAF), vol. 14, No. 10, May 15, 1949, pp. 5–6.

VERLIN R. PENDEGRASS, Primary Examiner